Patented Dec. 17, 1940

2,225,303

UNITED STATES PATENT OFFICE 2,225,303

ACID AND ALKALI RESISTANT PAINT

John W. Iliff, Springfield, and William F. Singleton, Philadelphia, Pa., assignors to E. I. du Pont de Nemours & Company, Wilmington, Del., a corporation of Delaware No Drawing. Application December 9, 1937, Serial No. 178,908

3 Claims. (Cl. 260—738)

This invention relates to coating compositions and more particularly to compositions which produce films that are resistant to attack by acids and alkalies.

Various types of compositions have been proposed as acid and alkali resistant coatings for use where the coatings are in continuous, periodic or occasional contact with acid or alkaline liquors or vapors. Among such are the silicate type coating compositions, synthetic resin vehicles as alkyd type resins, coumarone-indene type, etc. with so-called acid resistant pigments and short oil Bakelite varnish vehicles as for example a 25 gallon Bakelite varnish with so-called acid and alkali resistant pigments. Of these the most satisfactory is that made with a short oil Bakelite varnish which however is still deficient in some highly desirable and necessary properties in a satisfactory acid and alkali resistant coating composition.

This invention has as an object the provision of a suitable acid and alkali resistant coating composition. Another object is the provision of a composition which would produce coatings having a metallic luster such coatings being resistant to alkali. A further object is the provision of an acid and alkali resistant coating composition which possesses satisfactory covering power combined with satisfactory working properties. A still further object is the provision of a composition which produces coatings having a satisfactory initial appearance and which retain such appearance in service. Another object is the provision of a coating composition which can be produced economically enough to warrant its widespread use and the cost of which is consistent with the quality of service obtained from its use.

Still another object is the provision of an acid and alkali resistant coating composition having a metallic luster which possesses the proper stability in cans such that all the ingredients can be mixed together to produce a coating composition ready for use and further allow reasonable storage without having the composition become unfit for use. Other objects will be apparent from the description of the invention to follow.

These and other objects are attained by the present invention in which a coating composition is prepared by using a chlorinated rubber vehicle, suitably plasticized if desired, in which leafed metallic lead is dispersed as the pigment component of the composition.

The following example illustrates one of the preferred embodiments of the invention:

Example

| | Parts |
|---|---|
| Lead leaf paste | 5.0 |
| Chlorinated rubber | 1.2 |
| Plasticizer | 0.6 |
| Ester solvents | 1.4 |
| Hydrocarbon solvent | 3.8 |
| | 12.0 |

The parts are by weight and the above quantities in pounds produce one gallon of coating composition or paint.

The lead leaf paste is metallic lead in leaf-like particles or flakes dispersed in a volatile vehicle such as a liquid hydrocarbon as mineral spirits in quantity sufficient to prevent the scattering of the flaked particles by air drafts, etc. The volatile material is present in the paste to the extent of approximately 10%. A material found satisfactory as a leaf lead paste is manufactured and sold by the Metalead Products Corporation, San Francisco, California.

The chlorinated rubber is preferably the fully chlorinated material containing between approximately 63–68% chlorine. Lower chlorinated material, however, may be used in certain cases.

The plasticizer may be any which is compatible with chlorinated rubber in solution. Among such suitable plasticizers are chlorinated naphthalenes; chlorinated diphenyls; chlorinated paraffin waxes; certain synthetic resins, as coumarone-indene, phenol-formaldehyde, alkyd type; substantially non-volatile esters as dibutyl phthalate, triphenyl phosphate, tricresyl phosphate, etc. heat treated drying oils as linseed, chinawood, oiticia, etc., oleoresinous varnishes, etc. While the ratio of chlorinated rubber to plasticizer in the example is 2:1, this ratio may conveniently vary between from 1:3 to 3:1.

The chlorinated rubber may vary between about .4 and 2.0 lbs. per gallon of composition depending upon the viscosity of the chlorinated rubber and the properties required in the finished material. Less than .4 lb. per gallon yields a very thin film while more than 2 lbs. per gallon yields a composition which is thick and difficult to apply.

The ester solvent component in the example includes such esters as methyl, ethyl, propyl, butyl, etc., acetate, propionate, butyrate, or mixtures thereof, or suitable liquid aromatic or alkyl aryl esters, the choice being largely governed by the availability, cost and use considerations of the finished product. Other organic solvents such as ketones may be used to replace the ester solvent portion of the composition either wholly or in part. Further chlorinated hydrocarbons as carbon tetrachloride, ethylene dichloride, trichlorethylene, etc., may be used as sole or partial substitutes for the ester or ketone solvents. It is to be understood that the word solvent refers to the materials which are solvents for the chlorinated rubber and plasticizers compatible with the chlorinated rubber.

The hydrocarbon solvent portion of the composition comprises such aromatic or aliphatic liquid hydrocarbons as toluene, xylene, petroleum distillates such as contain a substantial proportion of cyclic compounds, hydrogenated petroleum distillates, etc.

The entire volatile solvent component of the composition may consist entirely of ester solvents or of liquid aromatic hydrocarbons. Further blends of either or both with aliphatic liquid hydrocarbons may be used. The choice of the proper volatile solvent portion of the composition will be dictated somewhat by the use for which the finished composition is intended and by the conditions for its use and the proper choice will be readily apparent to those skilled in the art of using such volatile solvents in coating compositions.

The films produced by the coating compositions of the invention give a characteristic metallic finish. The lead leaf paste constituent of the compositions may conveniently vary within the range of from 2–10 pounds per gallon of finished composition. Smaller amounts than two pounds per gallon of finished composition are not entirely effective in producing the necessary covering power for the composition and further do not give the necessary and desired protection against acid and alkali. Larger quantities than 10 lbs. per gallon give products which are usually too heavy for satisfactory commercial use as is and hence are not preferred. While the lead leaf pigment may be preferred, in most instances, to be used as the sole pigment constituent of the composition other pigments and filters may be used therewith for shading purposes if desired. The total amount of pigment, however, should preferably not be below the minimum quantity mentioned above. The pigments used for blending should be as far as possible of the type resistant to acid and alkali. Among such are titanium pigments, barium sulfate, silicate extenders, iron oxides, carbon blacks, chromium oxide green, etc. Where other pigments are used to shade the lead leaf the quantity of the latter in the finished product should not be appreciably lower than 2 lbs. per gallon of finished product.

At present a short oil Bakelite varnish is considered one of the best vehicles commercially for an acid and alkali resistant coating composition. This does not, however, give satisfactory results with leaf lead as used herein since the composition gels on standing. It has been found, however, that with chlorinated rubber as disclosed above the lead pigmented composition is not subject to this difficulty. As far as the applicants are aware, they are the first to produce a non-gelling ready mixed paint using leaf lead paste. The composition prepared according to the present invention is not subject to settling or gelling and has the further advantage that it yields a surface having a brilliant metallic luster which adds greatly to the surface coated with the composition. Such surface is much cleaner and neater in appearance than the ordinary black or dull acid or alkali resistant paints now used.

The products of the present invention may be applied by means of the usual conventional methods of spraying, dipping, brushing, etc. Various types of surfaces may be coated with the compositions such as wood, metal, concrete, plaster, brick, stucco or any such materials as might produce an alkaline reaction at the interface. The compositions may, in fact, be applied to any type of surface. The compositions may also be used as decorative and protective coatings both for interiors and exteriors. They are particularly adaptable for producing coatings on various types of machinery, chemical equipment, walls, supporting members and overhead structures in chemical manufacturing buildings, or any surface subjected to acid or alkaline vapors or condensates. Continual contact with strong liquid acid or alkaline media materially reduces the service life of the coating produced from the compositions.

It will be apparent from the description of the invention that we have discovered new and novel decorative and protective coating compositions which are particularly adaptable for producing acid and alkali resistant films. Tests have shown that coatings produced from the compositions of the invention are at least three times as resistant to acids and alkalies as the best compositions in commercial use at the present time.

It is apparent that many widely different embodiments of this invention may be made without departing from the spirit and scope thereof; and, therefore, it is not intended to be limited except as indicated in the appended claims.

We claim:

1. A coating composition which is highly resistant to acids and alkalies and which has a metallic luster when dry, comprising 2 to 10 pounds of finely divided leafed lead and from .4 to 2 pounds of chlorinated rubber for each gallon of coating composition.

2. A coating composition having a metallic luster when dry and being highly resistant to acids and alkalies, which comprises in proportion approximately 5 parts of finely divided leafed lead, 1.2 parts of chlorinated rubber, and 0.6 part of plasticizer.

3. A coating composition having approximately the following formula:

| | Parts by weight |
|---|---|
| Leaf lead paste | 5.0 |
| Chlorinated rubber | 1.2 |
| Plasticizer | 0.6 |
| Ester solvent | 1.4 |
| Hydrocarbon solvent | 3.8 |

JOHN W. ILIFF.
WILLIAM F. SINGLETON.